(12) United States Patent
Pandey et al.

(10) Patent No.: US 10,795,657 B2
(45) Date of Patent: Oct. 6, 2020

(54) METHOD OF MANAGING APPLICATIONS AND COMPUTING DEVICE USING THE SAME

(71) Applicant: Samsung Electronics Co., Ltd., Suwon-si, Gyeonggi-do (KR)

(72) Inventors: Nirmal Pandey, Uttar Pradesh (IN); Sunil Rathour, Uttar Pradesh (IN); Nitesh Goyal, Uttar Pradesh (IN); Ankit Agarwal, Uttar Pradesh (IN); Deepak Kumar Garg, Haryana (IN); Ayush Chaturvedi, Uttar Pradesh (IN); Vobbilisetty Sushant, Odisha (IN); Mohit Chhabra, Punjab (IN); Govind Maheshwari, Uttar Pradesh (IN); Rohit Chaturvedi, Uttar Pradesh (IN); Gorav Sharma, Rajasthan (IN); Arun Goyal, Madhya Predesh (IN); Dhananjay L Govekar, Maharashtra (IN); Abhishek Jain, Madhya Predesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/928,968

(22) Filed: Mar. 22, 2018

(65) Prior Publication Data
US 2018/0260206 A1    Sep. 13, 2018

(30) Foreign Application Priority Data

Mar. 13, 2017  (IN) .......................... IN-201711010034
Mar. 22, 2017  (IN) .............................. 201711010034

(51) Int. Cl.
G06F 8/61         (2018.01)
G06F 16/11        (2019.01)
(Continued)

(52) U.S. Cl.
CPC ............ G06F 8/62 (2013.01); G06F 11/1451 (2013.01); G06F 16/113 (2019.01); G06F 16/162 (2019.01)

(58) Field of Classification Search
CPC .................. G06F 8/61; G06F 8/65; G06F 8/62
(Continued)

(56) References Cited

U.S. PATENT DOCUMENTS 5,768,566 A      6/1998  Harikrishnan et al.
6,496,979 B1 *  12/2002  Chen ........................ G06F 8/61
                                                            717/178
(Continued)

FOREIGN PATENT DOCUMENTS

CN          105786480 A        7/2016
KR     10-2015-0045348 A        4/2015
(Continued)

OTHER PUBLICATIONS

Indian Office Action dated Jun. 12, 2020, issued in a counterpart an Indian Application No. 201711010034.

*Primary Examiner* — Phillip H Nguyen
(74) *Attorney, Agent, or Firm* — Jefferson IP Law, LLP

(57) ABSTRACT

A method of managing applications installed on a computing device and a computing device using the method are provided. The method includes identifying at least one application based on usage data of the computing device, fetching archive data and user data corresponding to the at least one application, creating backup data by correlating the archive data with the user data, and uninstalling the at least one application from the computing device once the creating of the backup data is completed.

20 Claims, 11 Drawing Sheets

(51) Int. Cl.
*G06F 16/16* (2019.01)
*G06F 11/14* (2006.01)

(58) Field of Classification Search
USPC ................................. 717/174, 175, 168, 169
See application file for complete search history.

(56) References Cited

U.S. PATENT DOCUMENTS

| | | | |
|---|---|---|---|
| 6,609,186 B1 | 8/2003 | Veres et al. | |
| 7,054,649 B2 | 5/2006 | Yamazaki et al. | |
| 8,359,016 B2* | 1/2013 | Lindeman | H04L 67/34 |
| | | | 455/414.1 |
| 8,527,977 B1* | 9/2013 | Cheng | G06F 8/62 |
| | | | 717/168 |
| 8,725,965 B2* | 5/2014 | Hart | G06F 11/1461 |
| | | | 711/1 |
| 9,778,816 B2* | 10/2017 | Ryu | G06F 11/3438 |
| 9,887,894 B2* | 2/2018 | Zalmanovitch | H04L 43/045 |
| 2005/0102329 A1* | 5/2005 | Jiang | G06F 11/1451 |
| 2006/0274662 A1* | 12/2006 | Tannenbaum | H04L 41/022 |
| | | | 370/242 |
| 2008/0155526 A1* | 6/2008 | Gokhale | G06F 8/62 |
| | | | 717/169 |
| 2011/0016089 A1* | 1/2011 | Freedman | G06F 11/1451 |
| | | | 707/640 |
| 2013/0173556 A1 | 7/2013 | Grigg et al. | |
| 2014/0075430 A1* | 3/2014 | Zheng | G06F 8/62 |
| | | | 717/174 |
| 2014/0245286 A1 | 8/2014 | Wong et al. | |
| 2015/0121485 A1* | 4/2015 | Collins | H04L 41/0803 |
| | | | 726/5 |
| 2015/0339059 A1 | 11/2015 | Kang et al. | |
| 2015/0370428 A1 | 12/2015 | Chan et al. | |
| 2015/0373107 A1* | 12/2015 | Chan | G06F 16/27 |
| | | | 709/205 |
| 2016/0026534 A1 | 1/2016 | Ru et al. | |
| 2016/0252944 A1* | 9/2016 | Kim | G06F 1/28 |
| | | | 713/340 |

FOREIGN PATENT DOCUMENTS

WO 2014-092689 A1 6/2014
WO 2017/003871 A1 1/2017

* cited by examiner

METHOD OF MANAGING APPLICATIONS AND COMPUTING DEVICE USING THE SAME

CROSS-REFERENCE TO RELATED APPLICATION(S)

This application is based on and claims priority under 35 U.S.C. § 119(a) of an Indian provisional patent application filed on Mar. 22, 2017 in the Indian Patent Office and assigned Serial number 201711010034, and of an Indian patent application filed on Jun. 13, 2017 in the Indian Patent Office and assigned Serial number 201711010034, the disclosure of each of which is incorporated by reference herein in its entirety.

BACKGROUND

1. Field

The disclosure relates to managing applications. More particularly, the present disclosure relates to managing applications in a computing device.

2. Description of the Related Art

In recent times, an exponential increase in usage of computing devices, such as smartphones, has been observed. This increase has been largely caused by advancements in technology and the manufacturing realm. Along with this increase, a wide range of entry level smartphones has also become available to users at affordable prices. However, these smartphones often have low storage space, low processing power, and low battery backup.

The low storage space of smartphones often affects the overall performance of smartphones. For instance, an operating system of a smartphone and a process related thereto consumes nearly half of the storage space of the smartphone. In addition, a user may download numerous applications and may store user content, such as songs, images, videos, documents, and the like, in the storage space, thereby further consuming the storage space. Thus, limited storage space is available for carrying tasks and operations when using the smartphone. This increases the load on a processor in the smartphone and significantly impacts the smartphone performance. For instance, delay in loading applications and executing new tasks have been observed, and this delay causes sluggish and delayed performance, heating, and high battery drain in the smartphone. Further, the limited storage space forces the user to uninstall applications and delete/move user content from time to time to make space for new applications and new user content. This may prove to be a time consuming and cumbersome task.

Most of the available solutions for managing storage space in smartphones are often cumbersome and complex to use for the general consumers. Thus, there exists a need for a solution to overcome the aforementioned deficiencies.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

In accordance with an aspect of the disclosure, a method of managing at least one application installed in a computing device is provided. The method includes identifying the at least one application based on usage data of the computing device, fetching archive data and user data corresponding to the at least one application, creating backup data by correlating the archive data with the user data, the archive data optionally being a compressed archive file and the user data optionally being a compressed user data file, uninstalling the at least one application from the computing device upon creation of the backup data, deleting junk data associated with the at least one application and other junk data according to a selection of a user of the computing device, and sending a notification to the user about an amount of deleted junk data.

In accordance with another aspect of the disclosure, a computing device for managing at least one application installed thereon is provided. The computing device includes a storage, and at least one processor configured to identify at least one application installed in the storage of the computing device based on usage data of the computing device, fetch archive data and user data corresponding to the at least one application. The at least one processor is further configured to create backup data by correlating the archive data with the user data, the archive data optionally being compressed archive data and the user data optionally being compressed user data. The at least one processor is further configured to uninstall the at least one application from the computing device upon creation of the backup data, delete junk data associated with the at least one uninstalled application and other junk data according to a selection of a user of the computing device, and send a notification to the user about an amount of deleted junk data.

In accordance with another aspect of the disclosure, a method of managing at least one application installed on a computing device is provided. The method includes fetching backup data corresponding to the at least one application, the backup data being based on a correlation between archive data and user data corresponding to the at least one application, the archive data optionally being a compressed archive file and the user data optionally being a compressed user data file. The method further comprises executing the archive file for installing a customized version of the at least one application, the customization being based on the user data file.

In accordance with another aspect of the disclosure, a computing device for managing at least one application installed thereon is provided. The computing device includes at least one processor configured to fetch backup data corresponding to the at least one application, the backup data being based on a correlation between archive data and user data corresponding to the at least one application, the archive data optionally being a compressed archive file and the user data optionally being a compressed user data file. The at least one processor is further configured to execute the archive file for installing a customized version of the at least one application, the customization being based on the user data file.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will become

Throughout the drawings, it should be noted that like reference numbers are used to depict the same or similar elements, features, and structures.

DETAILED DESCRIPTION

Figure 1:
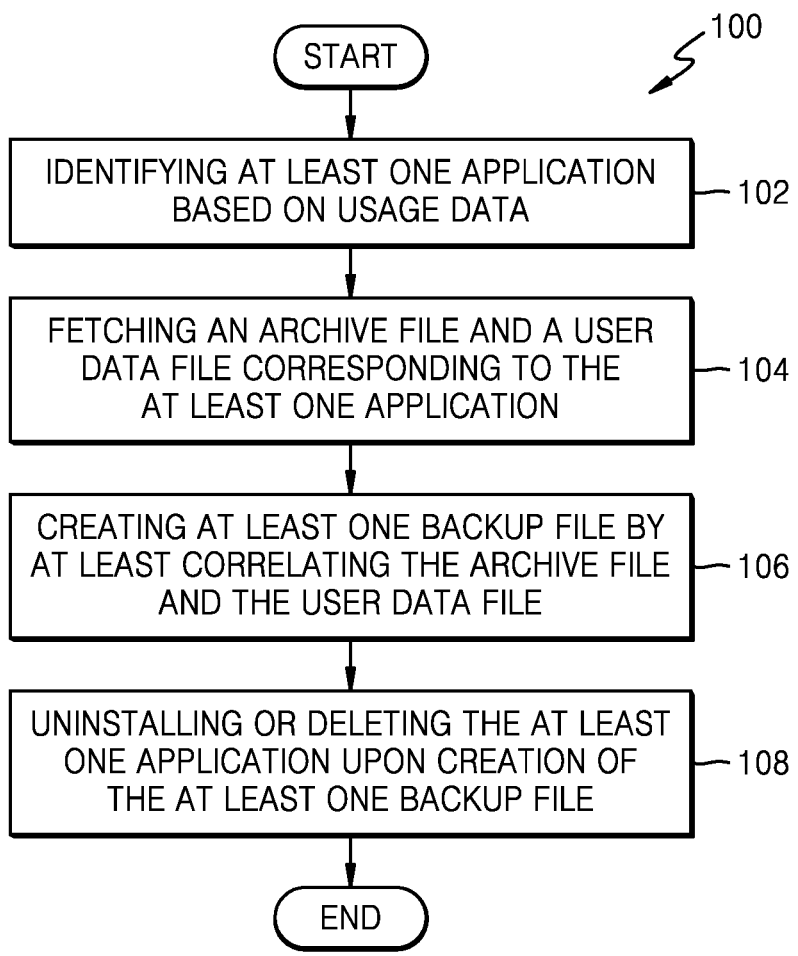
FIG. 1 illustrates a method of managing applications installed on a computing device according to an embodiment of the disclosure.

It may be advantageous to set forth definitions of certain words and phrases used throughout this document. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this document, and those of ordinary skill in the art should understand that in many, if not most instances, such definitions apply to prior, as well as future uses of such defined words and phrases.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 2:
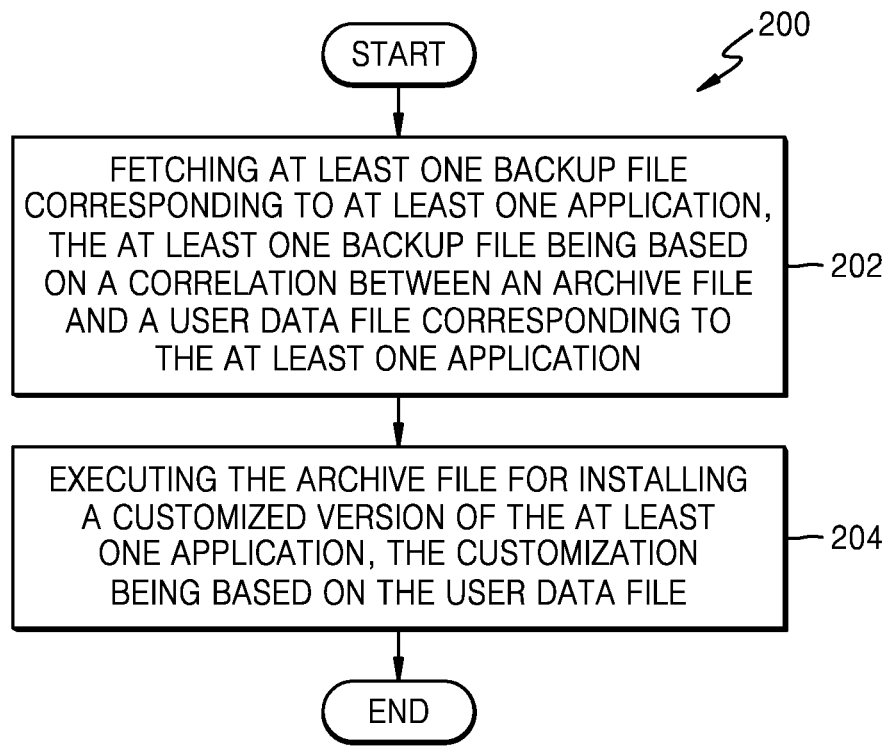
FIG. 2 illustrates a method of managing applications installed on a computing device according to another embodiment of the disclosure.

FIG. 1 illustrates a method 100 of managing applications installed on a computing device according to an embodiment of the disclosure. FIG. 2 illustrates a method 200 of managing applications installed on a computing device according to another embodiment of the disclosure. According to an embodiment, the computing device may include, but is not limited to, a smartphone, a wearable device, a smart device, a laptop, a tablet, a personal digital assistant (PDA), and the like. According to embodiments of the disclosure, the methods 100 and 200 may be performed in described orders or other orders. According to an embodiment, any number of operations of the methods 100 and 200 may be combined in any order to implement the methods 100 and 200 or an alternative method. Additionally, individual operations from the methods 100 and 200 may be skipped without departing from the scope of the disclosure. According to embodiments of the disclosure, the methods 100 and 200 may be implemented in any suitable hardware, software, firmware, or a combination thereof.

FIG. 1 illustrates a method of managing applications installed on a computing device according to an embodiment of the disclosure.

Referring to FIG. 1, the method 100 may include operation 102 in which at least one application is identified based on usage data of the computing device. The usage data corresponds to the computing device on which the application is installed. According to an embodiment of the disclosure, the usage data may include information associated with an operation of the computing device. According to an embodiment of the disclosure, the usage data may include information related to applications running on the computing device, time based usage statistics related to the applications, storage space required by different applications, types/categories of the applications, a location of the computing device at different times of a day, location based usage of the applications, usage of the applications based on an operating profile of the computing device, and the like. The time based usage statistics may indicate information such as a time at which the applications were last run, applications run during specific time periods, such as, events, weekends, vacations, and the like. In an embodiment of the disclosure, device data related to a calendar application, a messaging application, and a mail application may be accessed for correlating the applications with the specific time periods.

In an embodiment of the disclosure, the at least one application may be identified based on the usage data and at least one predetermined factor. According to an embodiment of the disclosure, the predetermined factor may include, but is not limited to, an event of a pre-determined time duration, a location of the computing device when the at least one application was or is executed, an operation profile of the computing device, a storage space of the computing device, and a time period associated with the at least one application. According to an embodiment of the disclosure, in the case of a sporting event, an application(s) accessed least during the last occurrence of the sporting event is identified. In another embodiment of the disclosure, applications accessed least based on the location of the computing device are identified. According to an embodiment of the disclosure, when a user of the computing device is at his/her workplace, the applications accessed least by the user, such as social media applications, are identified. In another embodiment of the disclosure, the at least one application is identified based on a time when the at least one application was last run. In an embodiment of the disclosure, at least one application that was run more than two weeks ago may be identified. In another embodiment of the disclosure, at least one application requiring a maximum storage space may be identified based on the storage space requirement corresponding to the at least one application.

Once the at least one application is identified, the at least one application may be selected based on the predetermined factor or factors. In an embodiment of the disclosure, all of the at least one identified applications may be selected. In an embodiment of the disclosure, when the user is at his/her workplace, the at least one application used least by the user is selected. In an embodiment of the disclosure, the at least one application may be selected based on a priority associated with the predetermined factor or factors. According to an embodiment of the disclosure, a priority associated with a sporting event may be higher than a priority assigned to a time period associated with the at least one application. Thus, when the selection of the at least one application is made based on the time period associated with the at least one application, a least used application may not be selected if it is determined that the least used application is related to an ongoing sporting event.

In another embodiment of the disclosure, the at least one application may be selected based on a user selection. In an embodiment of the disclosure, an application list may be rendered to the user through a user interface on the computing device and at least one application may be selected by the user from the application list.

The method 100 may further include operation 104 in which an archive file and a user data file corresponding to the at least one application that is selected may be fetched. In an embodiment of the disclosure, the archive file may be an executable file, upon execution of which, the at least one application is installed on the computing devices. In an embodiment of the disclosure, the archive file may include, but is not limited to, an apk file, a deb file, a Red Hat Package Manager (RPM) file, a Microsoft Installer (MSI) file, a Java ARchive (JAR) file, and the like. The user data file may include data, such as user preferences, user application settings, privacy settings, user data, and the like, associated with the at least one application.

The method 100 may further include operation 106 in which at least one backup file is created by correlating the archive file with the user data file. In an embodiment of the disclosure, the archive file may optionally be a compressed archive file and the user data file may optionally be a compressed user data file. In an embodiment of the disclosure, a single backup file including the archive file and the user data file may be created. In another embodiment of the disclosure, a backup file for each of the archive file and the user data file may be created. In the aforementioned embodiments regarding the backup file, at least one of the archive file and the user data file may be in a compressed format. Creating the backup file allows storing the user data file based on which the at least one application may be installed in the future or on another device in a customized manner That is, the at least one application, when installed in the future or on the other device, is in a state in which the user last used the at least one application.

In an embodiment of the disclosure, the backup file may be stored in a database, and in this case, a location corresponding to the backup file is also stored in the database. In an embodiment of the disclosure, when a separate backup file for the archive file and the user data file is created, locations of both of the backup files are stored in the database. Thus, while fetching the backup file in the future, both of the backup files may be retrieved.

The method 100 may further include operation 108 of uninstalling or deleting the at least one application upon creation of the backup file. In an embodiment of the disclosure, when the at least one application is being uninstalled, junk data associated with the at least one application may be deleted. In an embodiment of the disclosure, when the junk data is deleted, a directory corresponding to the at least one application may be selected based on a path of the directory. In an embodiment of the disclosure, if the path of the directory comprises the word "cache", a cache directory is selected. Subsequently, the selected cache directory is deleted. In another embodiment of the disclosure, the junk data associated with the at least one application or other junk data may be cleaned from the computing device according to a user selection. According to an embodiment of the disclosure, the user may enable a clean function on the computing device for cleaning junk data and select various options for cleaning the junk data. In an embodiment of the disclosure, the user may select manual cleaning or automatic cleaning of the junk data at various periods of time. In an embodiment of the disclosure, when the user selects the automatic cleaning of the junk data, the automatic cleaning may take place daily at a specified time, weekly at a specified date and time, monthly at a specified date and time, or at any other interval of time desired by the user. Upon completion of the junk data cleaning, in an embodiment of the disclosure, a notification may be sent to the user about the amount of cleaned junk data.

In an embodiment of the disclosure, in addition to the uninstalling of the at least one application, another application may be installed based on at least one backup file corresponding to the other application. In this embodiment of the disclosure, the other application to be installed may be selected based on the usage data of the computing device and the predetermined factor. In an embodiment of the disclosure, during a sporting event for example, an application used during a previous occurrence of the sporting event may be installed.

FIG. 2 illustrates a method of managing applications installed on a computing device according to another embodiment of the disclosure.

Referring to FIG. 2, the method 200 may include operation 202 in which at least one backup file corresponding to at least one application is fetched, the at least one backup file being based on a correlation between an archive file and a user data file corresponding to the at least one application. The archive file may optionally be a compressed archive file and the user data file may optionally be a compressed user data file. In an embodiment of the disclosure, a database comprising backup files may be accessed and the backup file corresponding to the at least one application may be fetched from the database. In an embodiment of the disclosure, the archive file and the user data file may both be included in a single backup file and may be stored at a single location in the database, from where the single backup file is fetched. In another embodiment of the disclosure, a backup file for each of the user data file and the archive file may exist and may be stored in different databases. In an embodiment of the disclosure, the archive file may be stored in an internal database, and the user data file may be stored in an external database. In this embodiment of the disclosure, a backup file corresponding to the archive may be stored at a location in the internal database, and a backup file corresponding to the user data file may be stored at a location in the external database. Thus, both of the backup files may be fetched from the internal and external databases.

The method 200 may further include operation 204 in which the archive file is executed for installing a customized version of the at least one application on the computing device, the customized version being based on the user data file. In an embodiment of the disclosure, at least one of the archive file and the user data file is in a compressed format. In this embodiment of the disclosure, the archive file or the user data, as the case may be, is first uncompressed. Subsequently, based on the user data file, the customized version of the at least one application may be installed on the computing device. The customized version of the at least one application may include user preferences, user settings, user privacy settings, user notifications settings, user restored data, and the like.

Figure 3:
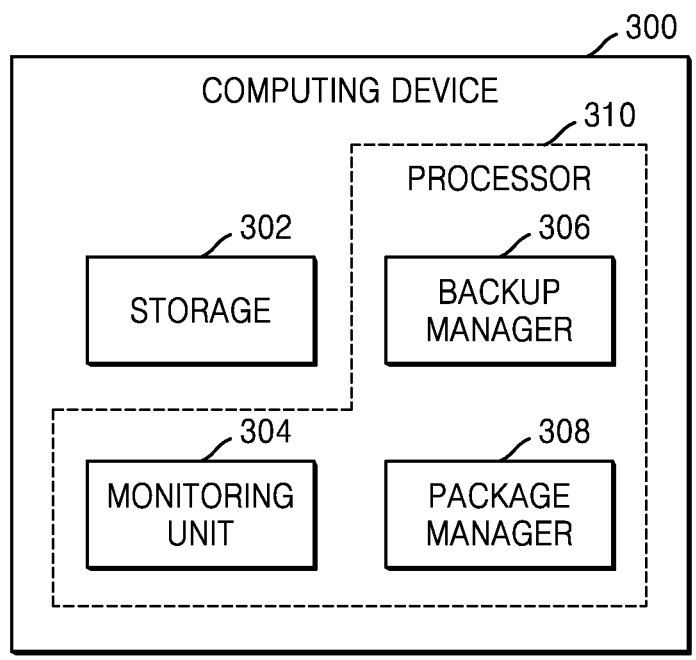
FIG. 3 illustrates a computing device according to an embodiment of the disclosure.

FIG. 3 illustrates a computing device according to an embodiment of the disclosure.

Referring to FIG. 3, a computing device 300 may be, but is not limited to, a smartphone, a laptop, a Chromebook, a smartwatch, a PDA, a thin client, a tablet, and the like. In an embodiment of the disclosure, the computing device 300 may include storage 302, a monitoring unit 304, a backup manager 306, a package manager 308, and the like. The monitoring unit 304, the backup manager 306, and the package manager 308 may be implemented as at least one hardware processor 310.

According to embodiment of the disclosure, the computing device 300 may manage applications installed thereon. For managing the applications, in an embodiment of the disclosure, the monitoring unit 304 may access usage data of the computing device 300, the usage data being stored in the storage space 302. Based on the usage data and at least one predetermined factor, the monitoring unit 304 may identify an application to be managed.

In an embodiment of the disclosure, the monitoring unit 304 may determine, for example, commencement of a New Year event based on data related to a calendar, a messages application, a mail application, and the like. Based on previous usage history related to a same/similar type of event analyzed based on the usage history and types/categories of applications, the monitoring unit 304 may identify social media applications and image processing based applications. In an embodiment of the disclosure, the monitoring unit 304 may also identify applications accessed least during, for example, the New Year event.

In another embodiment of the disclosure, the monitoring unit 304 may analyze the usage data to detect location information, such as a pattern of locations of frequently visited places by a user of the computing device 300. In an embodiment of the disclosure, the monitoring unit 304 may identify locations, such as a workplace and a home location of the user. In addition to determining the frequently visited places, the monitoring unit 304 may also identify applications used by the user when present at these frequently visited places. In an embodiment of the disclosure, the monitoring unit 304 may identify that the user uses more office tools applications and less social media applications when at the workplace and vice-versa when at home. Accordingly, the monitoring unit 304 may identify the applications most accessed and least accessed specific to a user location.

In another embodiment of the disclosure, the monitoring unit 304 may detect a pattern of available storage space based on the usage data. Accordingly, the monitoring unit 304 may determine a threshold limit (M1) for the storage space 300, at which the user may delete applications to free the storage space 302. In addition, the monitoring unit 304 may monitor a current storage space (M2) and a required storage space for future use (M3). In an embodiment of the disclosure, the monitoring unit 304 may monitor the storage space 302 to determine whether M2 and M3 are within a predefined range of M1. In a case when either one of M2 and M3 reaches the predefined range, the monitoring unit 304 may identify the least used applications.

In another embodiment of the disclosure, the monitoring unit 304 may analyze the usage data for detecting time information, such as detecting after how many days a specific application is used, which is herein referred to as pattern time. In an embodiment, '$T_1$', '$T_2$', . . . , '$T_N$' may be the pattern time after which '$A_1$', '$A_2$', . . . , '$A_N$' applications are respectively used. That is, the pattern time may be time information indicating a lapse of time after a final use of the specific application. Based on the pattern times corresponding to the applications, the monitoring unit 304 may determine a threshold time. In an embodiment of the disclosure, the monitoring unit 304 may determine the threshold time based on a median of the pattern times corresponding to the applications. In an embodiment of the disclosure, the monitoring unit 304 may identify the applications based on time elapsed since the applications were last run. In an embodiment of the disclosure, when a time elapsed since last run of an application exceeds the threshold limit, the application may be selected.

In an embodiment of the disclosure, once the application is identified, the monitoring unit 304 may select the application based on a predetermined factor. In an embodiment of the disclosure, when the user is at home, the monitoring unit 304 may select all of the least used applications. Further, in an embodiment of the disclosure, the monitoring unit 304 may select the applications based on a priority order associated with predetermined factors. Based on the priority order, an application may be identified. In an embodiment of the disclosure, when the computing device 300 may be approaching a low storage space state, the monitoring unit 304 may identify one or more, e.g., five, least used applications. Simultaneously, the monitoring unit 304 may identify an occurrence of a 'Sports based Event' and may determine that one of the five least used applications is a sports based application. In an embodiment of the disclosure, if a priority associated with the event is higher than a priority associated with the storage space 302, the monitoring unit 304 may identify the sports based application. In such a case, the next application (not related to sports), i.e., a sixth application, is identified.

In another embodiment of the disclosure, the monitoring unit 304 may select the application based on a user selection. In an embodiment of the disclosure, the monitoring unit 304 may render a list of the identified applications to the user through a user interface (not shown) of the computing device 300. In this embodiment of the disclosure, the applications selected by the user may be selected by the monitoring unit 304.

In an embodiment of the disclosure, the backup manager 306 may fetch an archive file and a user data file corresponding to each of the identified applications and subsequently create at least one backup file based on the archive file and the user data file. In an embodiment of the disclosure, the backup manager 306 may compress at least one of the archive file and the user data file. In an embodiment of the disclosure, the backup manager 306 may create a backup file corresponding to each of the archive file and the user data file. Once the backup file is created, the backup manager 306 may store the backup file in a database (not shown). In an embodiment of the disclosure, the database may be an internal database or an external database. In an embodiment of the disclosure, a communication module (not shown) of the computing device 300 may transmit the backup file to an external storage (not shown), such as a storage of another computing device or a cloud storage. The terms of the archive file, the user data file and the backup file can be interchangeably used as archive data, user data and backup data, respectively in the description.

Once the backup file is created, the package manager 308, in an embodiment of the disclosure, may uninstall or delete the identified applications from the computing device 300. During the uninstallation of the applications, the package manager 308 may select a directory corresponding to each of the applications based on a path of the directory. In an embodiment of the disclosure, in a case where the path of the directory includes a predetermined term, such as, 'cache', the package manager 308 may select a cache directory. Once the cache directory is selected, the package manager 308 may delete the cache directory. Thus, junk data related to the identified applications may be deleted. Once the applications are uninstalled, the applications are referred to as being in a zipped state. As used herein, a zipped application is an application for which a backup file was created and subsequently the application was uninstalled from the computing device 300.

In an embodiment of the disclosure, the computing device 300 may manage zipped applications of the computing device 300. In an embodiment of the disclosure, the monitoring unit 304 may identify a zipped application to be reinstalled based on one of the usage data and the user selection. In an embodiment of the disclosure, when the user is at his/her home, the monitoring unit 304 may identify most often used applications, such as social media applications. In another embodiment of the disclosure, the monitoring unit 304 may identify the zipped application based on the user selection. In this embodiment of the disclosure, a list of zipped applications may be rendered to the user through the user interface and the user may select the zipped application from the list. In another embodiment of the disclosure, the user may access a folder comprising the zipped applications and may subsequently select the zipped application from the folder.

Once the zipped application is selected, the backup manager 306 may fetch at least one backup file corresponding to the zipped application. The backup file corresponding to the zipped application may include an archive file and a user data file, at least one of which is in a compressed format. In an embodiment of the disclosure, the package manager 308 may install a customized version of the zipped application based on the user data file.

In an embodiment of the disclosure, the computing device 300 may optionally present a status of the zip and unzip functionality as described above to a user on another computing device, such as a wearable smartwatch. In another embodiment, the computing device 300 may render to the user one or more options of zipping the applications through the other computing device. In an embodiment of the disclosure, the applications may be presented to the user on the other computing device and upon receiving a user gesture, such as a selection and swipe, or a selection and drag, the computing device 300 may zip the applications.

In an embodiment of the disclosure, the computing device 300 may provide a status of the applications to the user through the user interface. The status, in an embodiment of the disclosure, may be indicative of a time period, such as a number of days, after which the applications would be zipped. In an embodiment of the disclosure, the status may be rendered to the user in the form of an application icon corresponding to the application. The application icon may provide a dynamic bar indicative of the status of the application. In an embodiment of the disclosure, the computing device 300 may present the user with an option of updating the status, such as by swiping on the dynamic bar to change the status of the application.

The triggers, the monitoring unit 304, and the processor 402 may be implemented as at least one hardware processor. The data may also be implemented as at least one hardware memory device.

Figure 4:
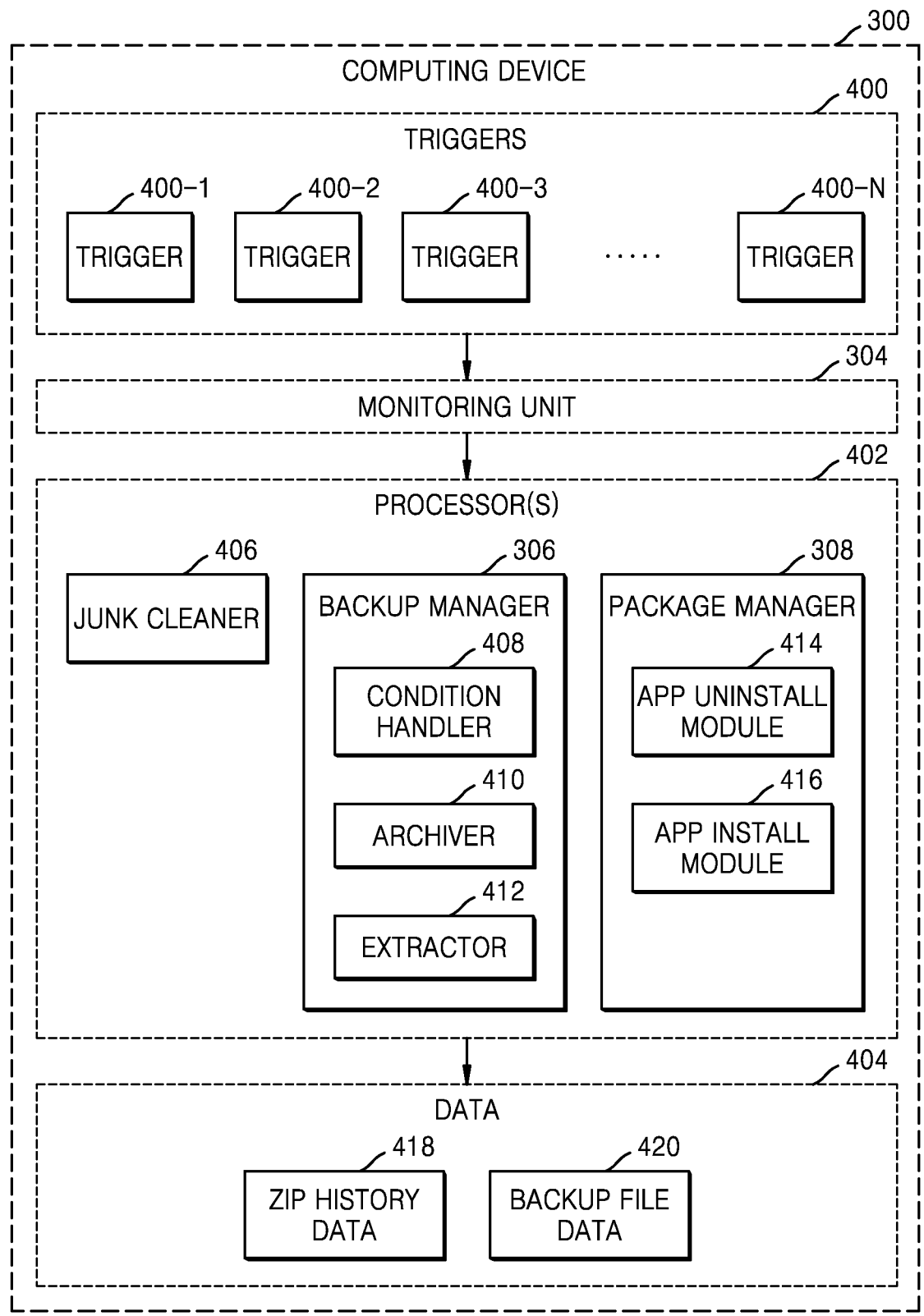
FIG. 4 illustrates a computing device according to another embodiment of the disclosure.

FIG. 4 illustrates a computing device according to another embodiment of the disclosure.

Referring to FIG. 4, a computing device 300 may further include triggers 400, processor(s) 402, and data 404. The triggers 400 may include one or more triggers 400-1, 400-2, 400-3, . . . , 400-N. The processor(s) 402 may include a junk cleaner 406, the backup manager 306, and the package manager 308. The backup manager 306 may include a condition handler 408, an archiver 410, and an extractor 412. The package manager 308 may include an app uninstall module 414 and an app install module 416. The data 404 may include zip history data 418 and backup file data 420.

In an embodiment of the disclosure, the triggers 400 may be activated based on one or more predetermined criterions. In an embodiment of the disclosure, when a criterion based on a storage space threshold limit is met, the trigger 400-1 may be activated. In another embodiment of the disclosure, when the user may reach a frequently visited location, such as the home location, the trigger 400-2 may be activated. In an embodiment of the disclosure, the monitoring unit 304 may receive a triggering signal from the triggers 400 and based on the triggering signal, the monitoring unit 304 may identify and/or select the application. In an embodiment of the disclosure, the monitoring unit 304 may transmit an identifier, such as an application name associated with the application, to the processor 402.

When the triggering signal is a trigger to uninstall an application, the condition handler 408 may fetch the archive file and the user data file corresponding to the application. Subsequently, the archiver 410 may create at least one backup file by correlating the archive file with the user data file. In an embodiment of the disclosure, the archiver 410 may compress at least one of the archive file and the user data file. Subsequently, the archiver 410 may store the backup file in the backup file data 420.

Once the backup file is stored, the app uninstall module 414 may receive an indication to uninstall the application. Subsequently, the app uninstall module 414 may uninstall the application. Further, in an embodiment of the disclosure, the junk cleaner 406 may clean junk data associated with the application. In this case, the application is said to be in the zipped state and information related to the zipped application may be stored in zip history data 418.

When the triggering signal is a trigger to install a zipped application, the extractor 412 may fetch the backup file corresponding to the application from the backup file data 420. On fetching the backup file, the extractor 412, in an embodiment of the disclosure, may unzip at least one of the archive file and the user data file. Thereafter, the app install module 416 may install a customized version of the application based on the user data file.

Figure 5:
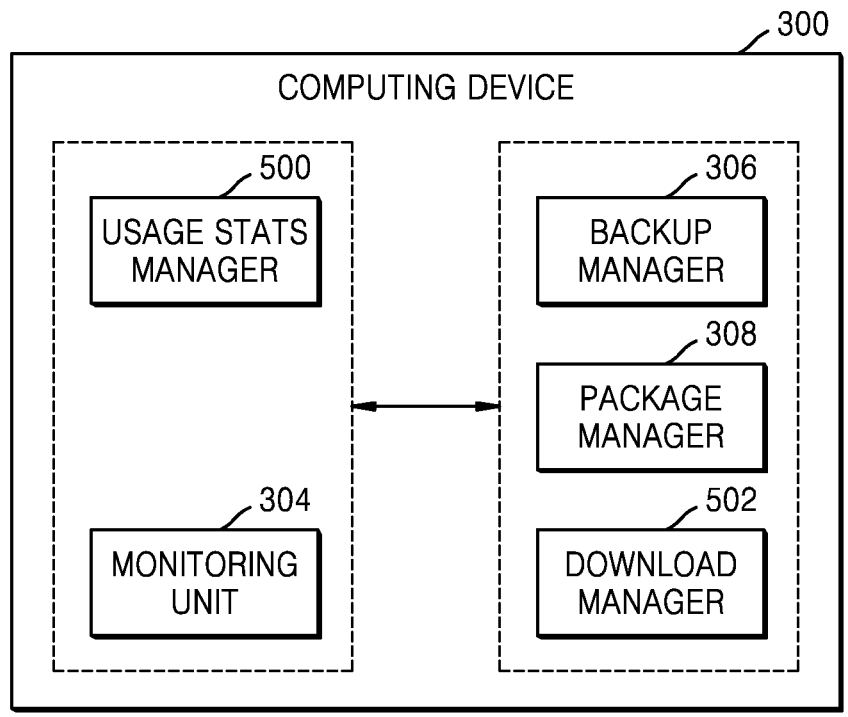
FIG. 5 illustrate an computing device according to another embodiment of the disclosure.

FIG. 5 illustrates a computing device according to another embodiment of the disclosure.

Referring to FIG. 5, the computing device 300 may further include a usage stats manager 500 and a download manager 502. In an embodiment of the disclosure, the usage stats manager 500 may record information, such as device usage data of the computing device 300, related to an operation of the computing device 300. The download manager 502, in an embodiment of the disclosure, may record information associated with applications downloaded on the computing device 300. In an embodiment of the disclosure, the usage stats manager 500 may determine the applications installed on the computing device 300 based on information provided by the download manager 502. Once the applications are determined, the usage stats manager 500 may record information related thereto.

Figure 6:
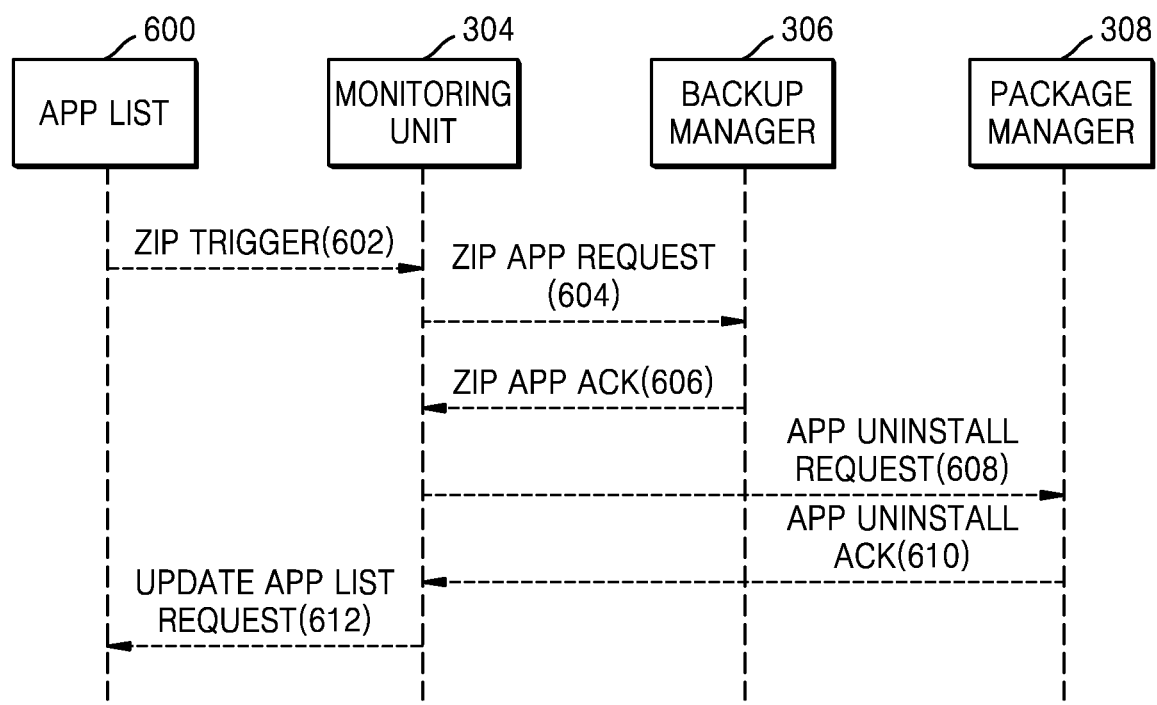
FIG. 6 illustrates a flow sequence for managing applications installed on a computing device according to an embodiment of the disclosure.

FIG. 6 illustrates a flow sequence for managing applications installed on a computing device according to an embodiment of the disclosure.

Referring to FIG. 6, a flow sequence is illustrated for managing applications installed on the computing device 300 according to an embodiment of the disclosure. In an embodiment of the disclosure, an app list 600 transmits a zip trigger 602 to the monitoring unit 304. The app list 600 may be implemented as user interface controlled by a hardware device such as the processor 310. The zip trigger 602, in an embodiment of the disclosure, may be indicative of an identifier, such as an application name associated with the application. On receiving the zip trigger 602, the monitoring unit 304 may transmit a zip app request 604 to the backup manager 306. In an embodiment of the disclosure, the zip app request 604 may include a path and the application name of the application. On receiving the zip app request 604, the backup manager 306 may fetch the archive file and the user data file corresponding to the application. Subsequently, the backup manager 306 may create the backup file corresponding to the application, in an embodiment of the disclosure. Once the backup file is created, the backup manager 306 may transmit a zip app ack 606 to the monitoring unit 304.

Subsequently, the monitoring unit 304 may transmit an app uninstall request 608 including the application identifier to the package manager 308. On receiving the app uninstall request 608, the package manager 308 may uninstall the application and may delete junk data associated with the application during uninstallation. Once the application is uninstalled, the package manager 308 may transmit an app uninstall ack 610 to the monitoring unit 304. On receiving the app uninstall ack 610, the monitoring unit 304 may transmit an update app list request 612 to the app list 600. On receiving the update app list request 612, the app list 600 may remove the application from the list of applications and may create and store the application in a list of zipped applications. In an embodiment of the disclosure, the app list 600 may further create a folder and may store the zipped application in the folder. In an embodiment of the disclosure, the folder may be displayed to the user through a user interface.

The monitoring unit 304, the backup manager 306 and the package manager 308 may be implemented as at least one hardware processor.

Figure 7:
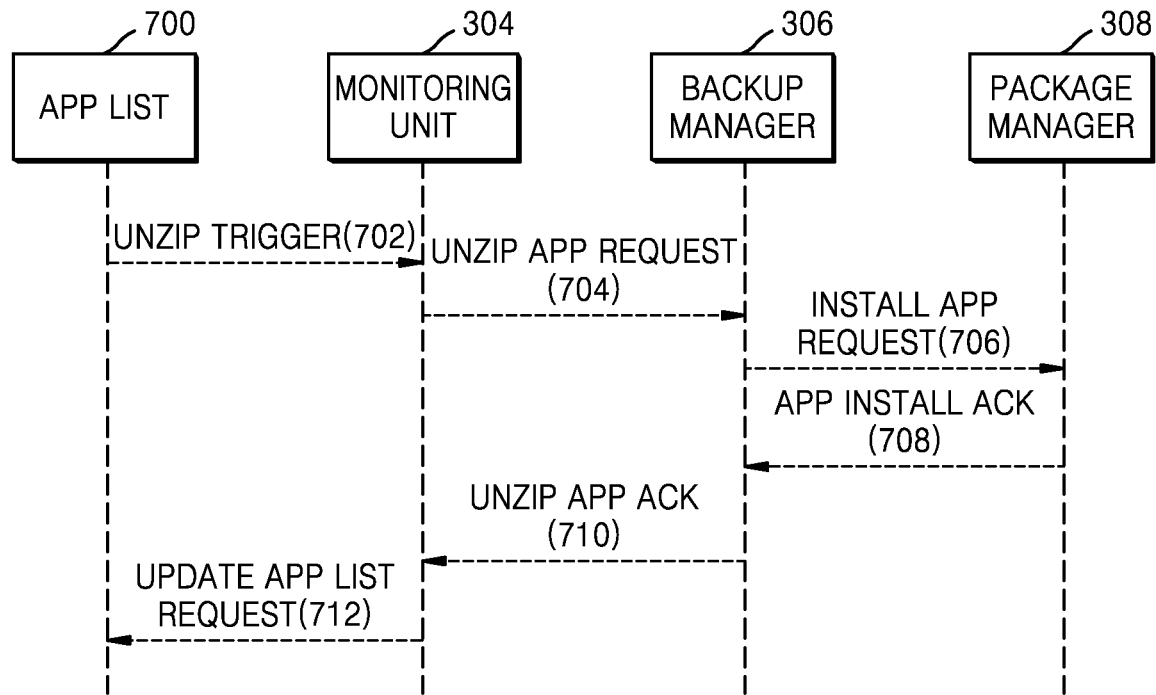
FIG. 7 illustrates a flow sequence for managing applications installed on a computing device according to another embodiment of the disclosure.

FIG. 7 illustrates a flow sequence for managing applications installed on a computing device according to an embodiment of the disclosure.

Referring to FIG. 7, an app list 700 may transmit an unzip trigger 702 to the monitoring unit 304. The app list 700 may be implemented as a user interface controlled by a hardware device such as the processor 310. In an embodiment of the disclosure, the unzip trigger 702 may include an application identifier, for example a name, associated with the application. On receiving the unzip trigger 702, the monitoring unit 304 may transmit an unzip app request 704 to the backup manager 306. The unzip app request 704, in an embodiment of the disclosure, may include a path and the application identifier corresponding to the application. On receiving the unzip app request 704, the backup manager 306, in an embodiment of the disclosure, may fetch the backup file corresponding to the application and may subsequently unzip at least one of the archive file and the user data file stored in the backup file. The backup manager 306 may subsequently transmit an install app request 706 to the package manager 308. On receiving the install app request 706 from the backup manager 306, the package manager 308 may install a customized version of the application based on the user data file. Once the customized version of the application is installed, the package manager 308 may transmit an app install ack 708 to the backup manager 306. On receiving the app install ack 708, the backup manager 306 may delete the backup file corresponding to the application. In an embodiment of the disclosure, the backup manager 306 may transmit an unzip ack 710 to the monitoring unit 304. On receiving the unzip ack 710, the monitoring unit 304 may transmit an update app list request 712 to the app list 700. On receiving the update app list request 712, the app list 700 may include the application in a list of applications.

The monitoring unit 304, the backup manager 306 and the package manager 308 may be implemented as at least one hardware processor.

Figure 8:
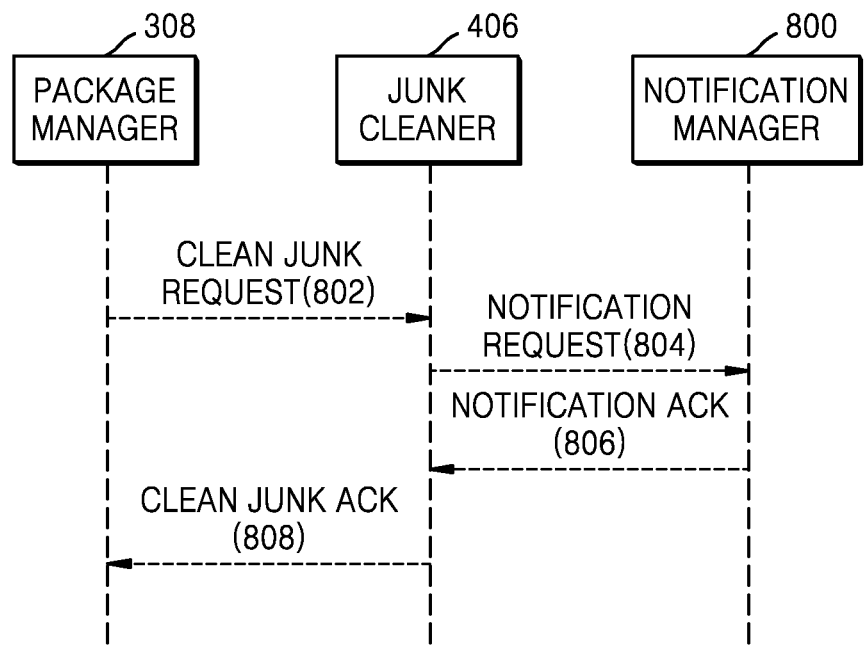
FIG. 8 illustrates a flow sequence for managing applications installed on a computing device according to another embodiment of the disclosure.

FIG. 8 illustrates a flow sequence for managing application installed on a computing device according to an embodiment of the disclosure.

Referring to FIG. 8, the package manager 308, during the uninstallation of the application, may transmit a clean junk request 802 to the junk cleaner 406. The clean junk request 802 may include an application identifier and a path associated with the application. On receiving the clean junk request 802, the junk cleaner 406 may clean the junk data associated with the application. Once the junk data is cleaned, the junk cleaner 406 may transmit a notification request 804 to a notification manager 800 of the computing device 300. On receiving the notification request 804, the notification manager 800 may display a notification indicating clearance of the junk data to the user through the user interface. Subsequently, the notification manager 800 may transmit a notification ack 806 to the junk cleaner 406. On receiving the notification ack 806, the junk cleaner 406 may transmit a clean junk ack 808 to the package manager 308.

The package manager 308, the junk cleaner 406, and the notification manager 800 may be implemented as at least one hardware processor.

FIGS. 9A, 9B and 9C, and FIGS. 10A and 10B illustrate various instances of managing applications installed on a computing device according to an embodiment of the disclosure.

Figure 9A:
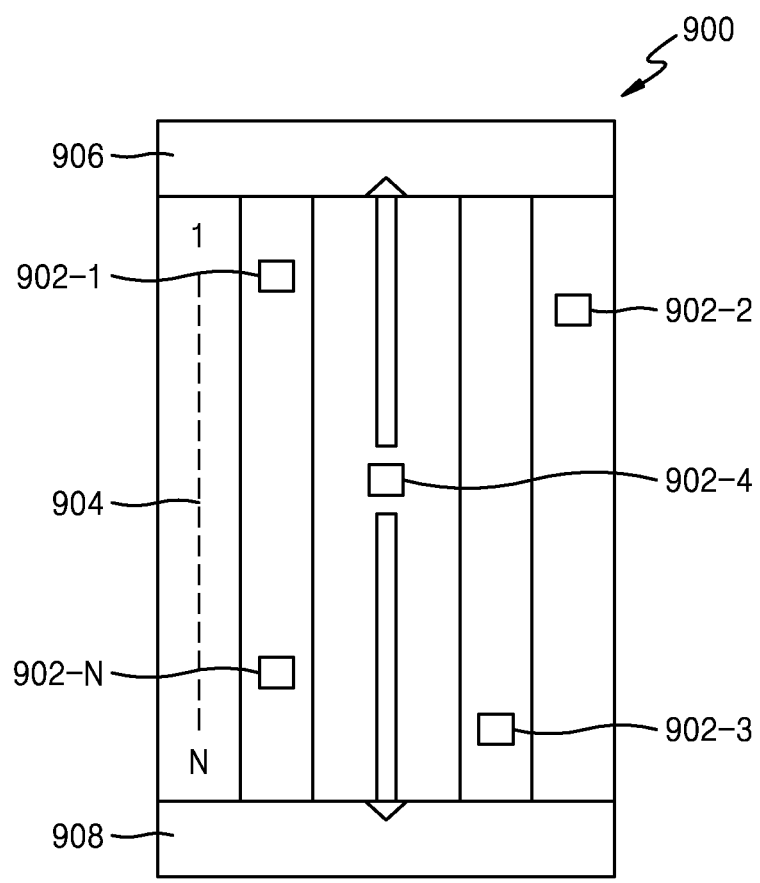
FIGS. 9A, 9B and 9C illustrate various instances of managing applications installed on a computing device according to embodiments of the disclosure.
Figure 9B:
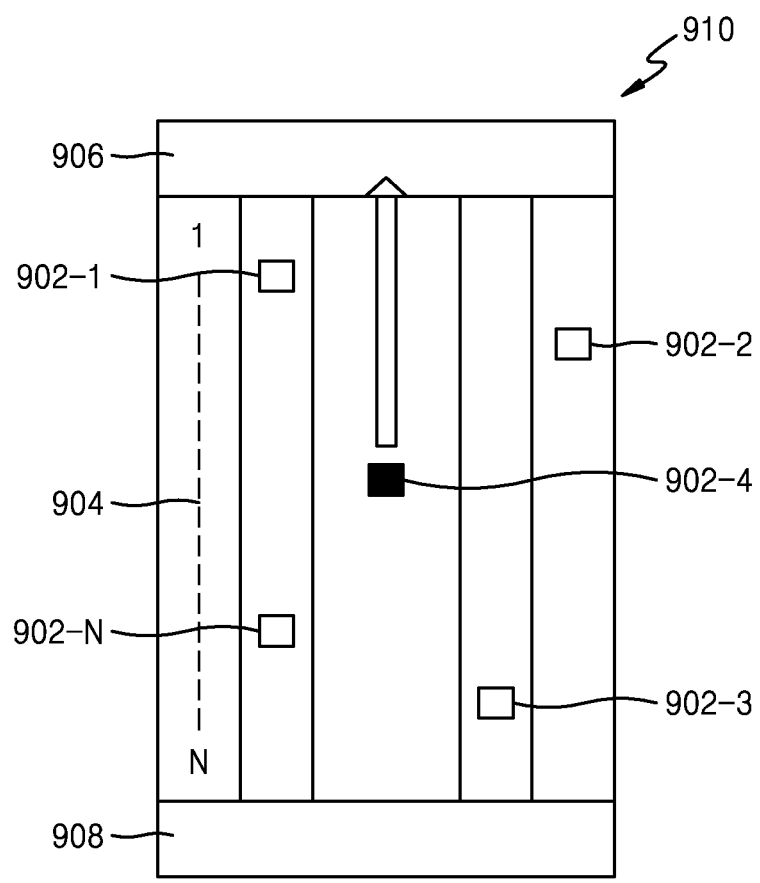
Figure 9C:
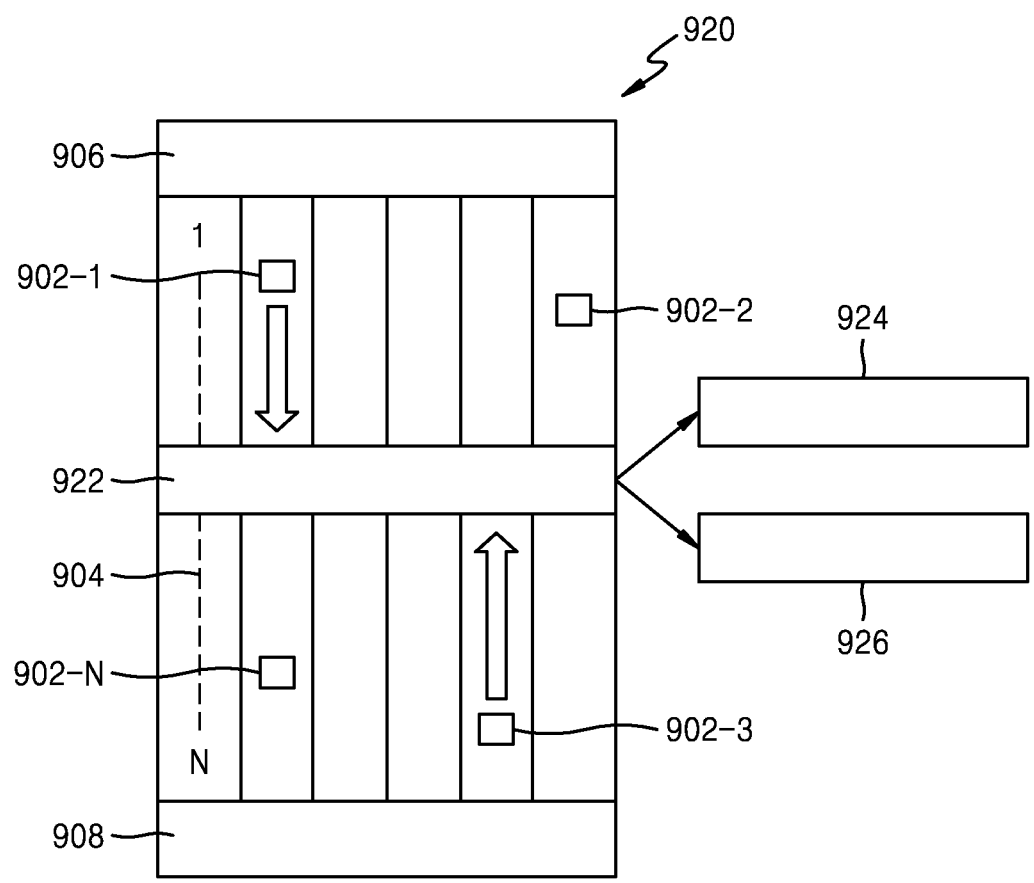

Referring to FIGS. 9A to 9C, user interfaces 900, 910 and 920 are used for managing applications on the computing device 300. As shown in FIG. 9A, a plurality of applications 902-1, 902-2, 902-3, 902-4, . . . , and 902-N, collectively referred to as applications 902 and individually referred to as an application 902, are shown. Further, a timeline 904 indicative of a time period after which the application 902 may be zipped is shown. Further, a first region 906 and a second region 908 are shown.

In an embodiment of the disclosure, a user may select an application for zipping. The user may select, for example, the application 902-4 through a user input, such as a touch input. To zip the application 902-4, in an embodiment of the disclosure, the user may drag and drop the application 902-4 in the first region 906. Once the application 902-4 is dropped in the first region 906, the application 902-4 is zipped. In an embodiment of the disclosure, the user may define a list of applications, hereinafter referred to as a white list, which are not to be zipped. For adding applications to the white list, the user may select an application and subsequently drag and drop the application to the second region 908. In an embodiment of the disclosure, the user may also select and then drag and drop the application 902-4 from the first region 906 to the second region 908.

Referring to FIG. 9B, for zipping all applications pertaining to a category of applications, the user may select an application such as the application 902-4, by long pressing the application and subsequently dragging and dropping the application in the first region 906. Long pressing the application 902-4 results in the selection thereof and subsequently, all applications similar to the selected application may be zipped.

Referring to FIG. 9C, in an embodiment of the disclosure, the computing device 300 may detect an event and a corresponding event bar 922 may be displayed on the user interface 920. In an embodiment of the disclosure, the user may choose to zip or add one or more applications to the white list for the duration of the event. In an embodiment of the disclosure, the user may select an application such as the application 902-1, and subsequently drag the application to the event bar 922. When the application is rested over the event bar 922, a region 924 and a region 926 may be rendered on the user interface 920. For adding an application to the white list, the user may drop the application in the region 924. In another embodiment of the disclosure, for zipping the application for the duration of the event, the user may drop the application on the region 926.

Figure 10A:
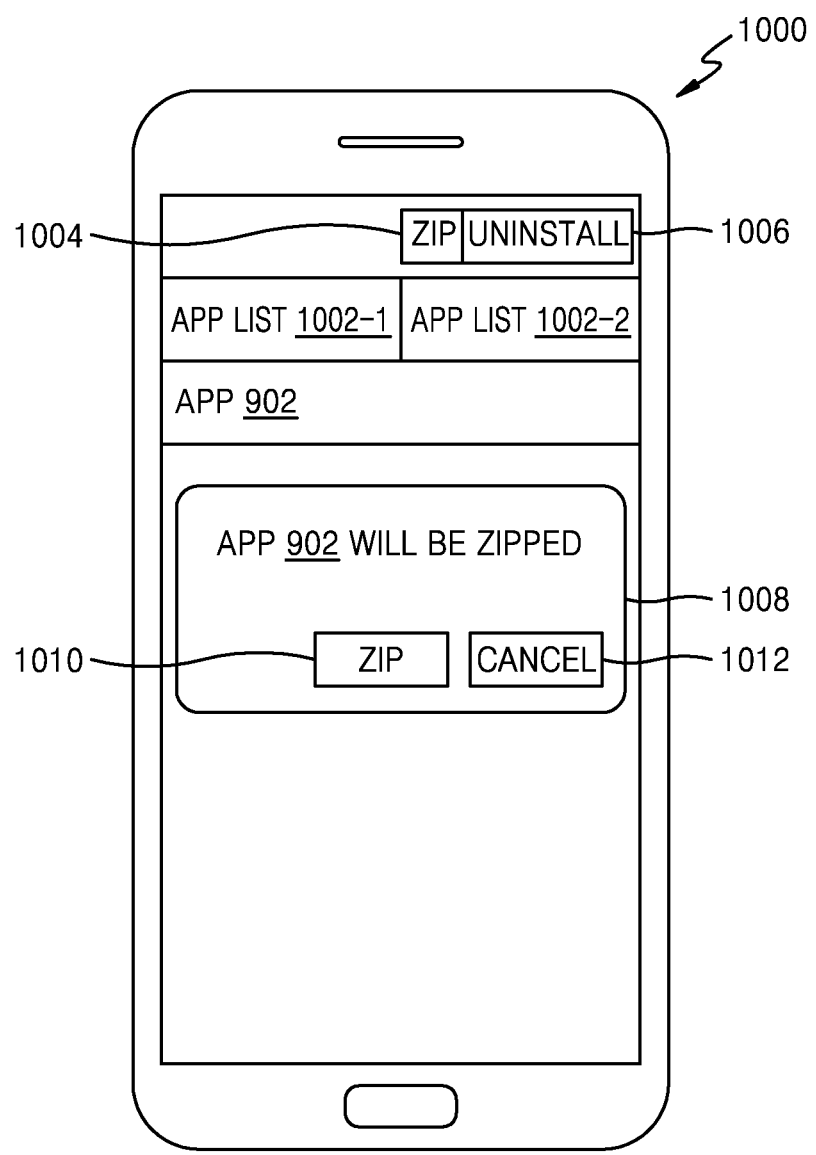
FIGS. 10A and 10B illustrate various instances of managing applications installed on a computing device according to embodiments of the disclosure.

Referring to FIG. 10A, a user interface 1000 may be displayed to provide the user with an option to select an app list 1002-1, such as a list of downloaded applications, or an app list 1002-2, such as a list of preloaded applications. On selecting the app list 1002-1, the user may be provided with an option to select the application 902 for either zipping through a zip action button 1004 or uninstalling through an uninstall action button 1006. In an embodiment of the disclosure, the user may select the application 902 for zipping. In an embodiment of the disclosure, a notification 1008 may then be displayed to the user. Subsequently, the user may choose to either zip the application through a zip action button 1010 or may choose to cancel the option of zipping the application by selecting a cancel action button 1012.

Figure 10B:
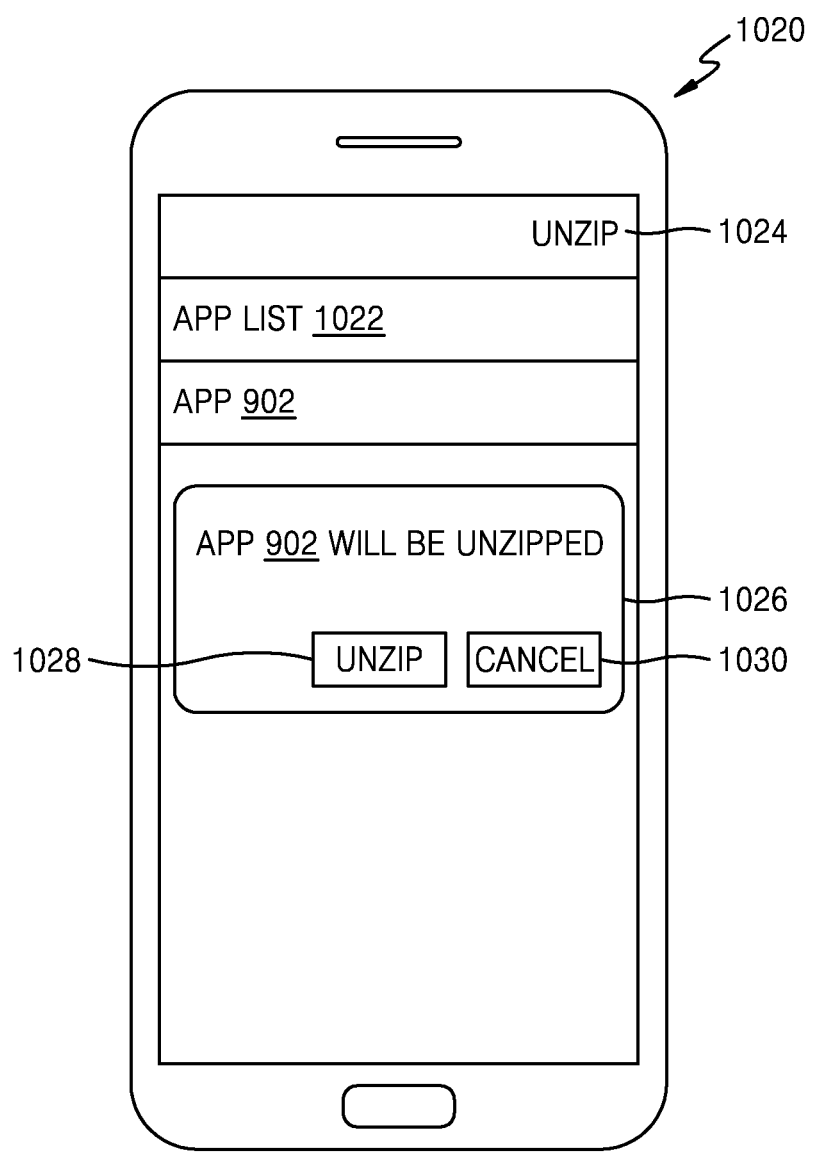

Referring to FIG. 10B, a user interface 1020 may be displayed to provide the user with an app list 1022, such as a list of zipped applications. In an embodiment of the disclosure, for unzipping an application such as the application 902, the user may select the application 902 and may then select an unzip action button 1024. On selecting the unzip action button 1024, a notification 1026 may be provided to the user. The user may subsequently select either an unzip action button 1028 for unzipping the application 902, or may select a cancel action button 1030 for cancelling the option of unzipping the application 902.

Figure 11:
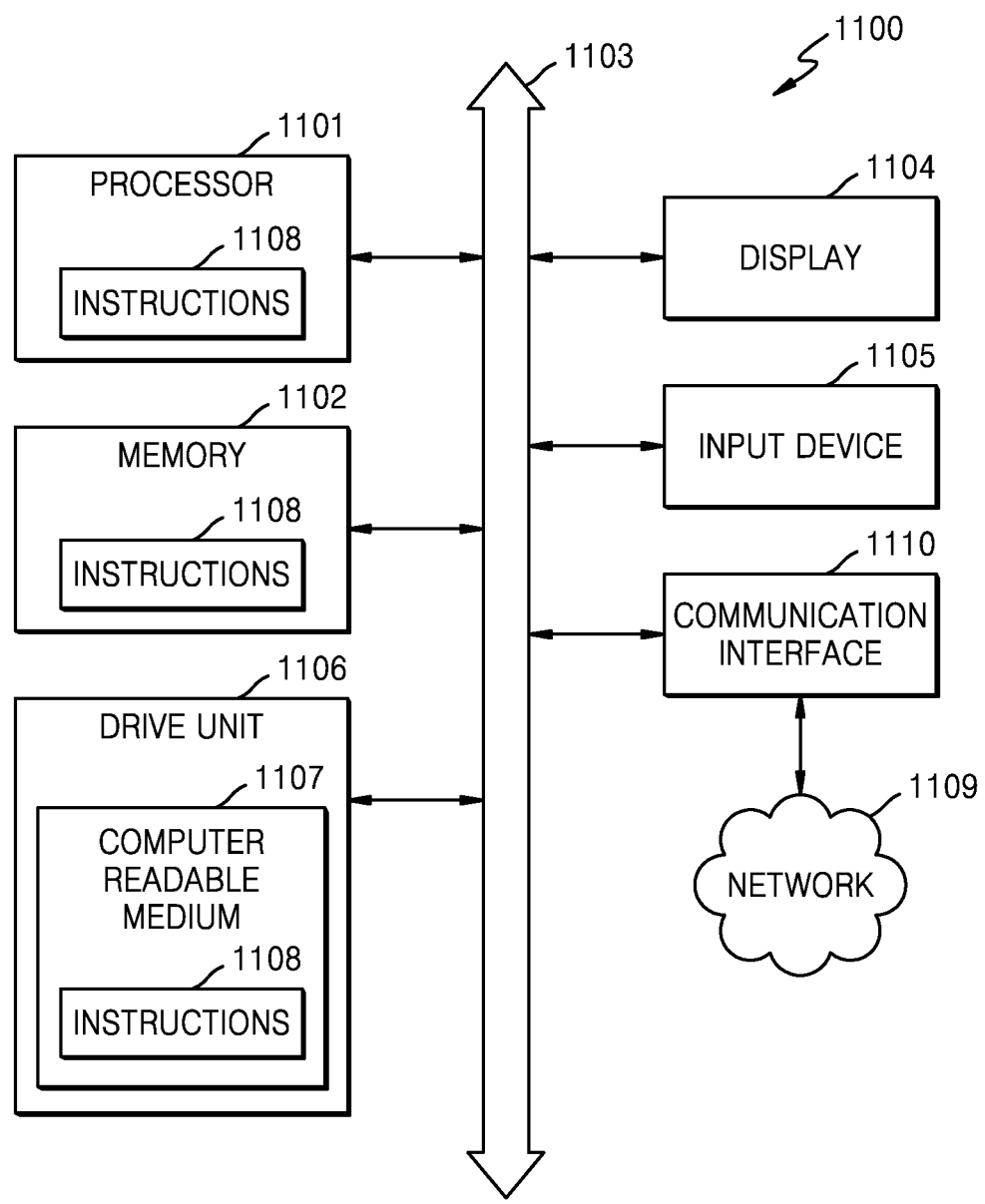
FIG. 11 illustrates a hardware configuration of a computing device according to an embodiment of the disclosure.

FIG. 11 illustrates a hardware configuration of a computing device in the form of a computing system.

Referring to FIG. 11, the computing device 300 in the form of a computing system 1100 may store a set of instructions that may be executed to control the computing system 1100 to perform any one or more of the methods disclosed above. The computing system 1100 may operate as a standalone device or may be connected, e.g., using a network, to other computer systems or peripheral devices.

In a networked deployment, the computing system 1100 may operate in the capacity of a server or as a client user computer in a server-client user network environment or master-slave network environment, or as a peer computer system in a peer-to-peer (or distributed) network environment. The computing system 1100 may also be implemented as or incorporated into various devices, such as a personal computer (PC), a tablet PC, a set-top box (STB), a PDA, a mobile device, a palmtop computer, a laptop computer, a desktop computer, or any other machine capable of executing a set of instructions (sequentially or in a different manner) that specify actions to be taken by that machine. Further, while the computing system 1100 is used in the disclosure, it is apparent to one of ordinary skill in the art that the term "device" may also be used to include any collection of systems or sub-systems that individually or jointly execute a set, or multiple sets, of instructions to perform one or more computer functions.

The computing system 1100 may include a processor 1101, e.g., a central processing unit (CPU), a graphics processing unit (GPU), or both. The processor 1101 may be a component in a variety of systems. In an embodiment of the disclosure, the processor 1101 may be part of a standard PC or a workstation. The processor 1101 may include one or more general processors, digital signal processors, application specific integrated circuits, field programmable gate arrays, servers, networks, digital circuits, analog circuits, combinations thereof, or other now known or later developed devices for analyzing and processing data The processor 1101 may also implement a software program, such as code generated manually (i.e., programmed).

The computing system 1100 may include a memory 1102 that may communicate with other components of the computing system 1000 via a bus 1103. The memory 1102 may be a main memory, a static memory, or a dynamic memory. The memory 1102 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In an embodiment of the disclosure, the memory 1102 may include a cache or random access memory for the processor 1101. In an alternative embodiment of the disclosure, the memory 1102 may be separate from the processor 1101, and may be a cache memory of a processor, the system memory, or other memory. The memory 1102 may be an external storage device or database for storing data, such as a hard drive, compact disc (CD), digital video disc (DVD), memory card, memory stick, floppy disc, universal serial bus (USB) memory device, or any other device operative to store data. The memory 1102 may be operable to store instructions executable by the processor 1101. The functions, acts, or tasks illustrated in the figures or described in the disclosure may be performed by the processor 1101 that is configured to execute the instructions stored in the memory 1102. The functions, acts, or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

The computing system 1100 may further include, in an embodiment of the disclosure, a display 1104 such as a liquid crystal display (LCD), an organic light emitting diode (OLED), a flat panel display, a solid state display, a cathode ray tube (CRT), a projector, a printer or other now known or later developed display device for outputting determined information. The display 1104 may act as an interface for a user to see the functioning of the processor 1101, or specifically may act as an interface with software stored in the memory 1102 or in a drive unit 1106.

The computing system 1100 may also include a disk or optical drive unit 1106 according to an embodiment of the disclosure. The drive unit 1106 may include a computer-readable medium 1107 in which one or more sets of instructions 1108, e.g. software, may be embedded. Further, the instructions 1108 may embody one or more of the methods or logic as described above. In an embodiment of the disclosure, the instructions 1108 may reside completely, or at least partially, within the memory 1102 or within the processor 1101 during execution by the computing system 1100. The processor 1101 and the memory 1102 may also include computer-readable media as discussed above.

The disclosure also provides in an embodiment a computer-readable medium that includes instructions 1108 or that receives and executes instructions 1108 responsive to a propagated signal so that a device connected to a network 1109 may communicate voice, video, audio, images or any other data over the network 1109. Further, the instructions 1108 may be transmitted or received over the network 1109 via a communication port or interface 1110 or using the bus 1103. The communication port or interface 1110 may be a part of the processor 1101 or may be a separate component. The communication port 1110 may be created as software or may be a physical hardware connection. The communication port 1110 may be configured to be connected to the network 1109, external media, the display 1104, or any other components in the computing system 1100, or combinations thereof. The connection with the network 1109 may be a physical connection such as a wired Ethernet connection, or may be established wirelessly. Likewise, the additional connections with other components of the computing system 1100 may be physical connections or may be established wirelessly. Alternatively, the network 1109 may be directly connected to the bus 1103.

The network 1109 may include wired networks, wireless networks, Ethernet AVB networks, or combinations thereof. The wireless network may be a cellular telephone network, an 802.11, 802.16, 802.20, 802.1Q or Wi Max network. Further, the network 1109 may be a public network such as the Internet, a private network such as an intranet, or combinations thereof, and may utilize a variety of networking protocols now available or later developed including, but not limited to TCP/IP based networking protocols.

Additionally, according to an embodiment of the disclosure, the computing system 1100 may include an input device 1105 configured to allow a user to interact with any of the components of the computing system 1100. The input device 1105 may be a number pad, a keyboard, or a cursor control device, such as a mouse, or a joystick, touch screen display, remote control or any other device operative to interact with the computing system 1100.

In an alternative embodiment of the disclosure, dedicated hardware implementations, such as application specific integrated circuits, programmable logic arrays and other hardware devices, may be constructed to implement various parts of the computing system 1100. Applications that may include the computing system 1100 may broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the computing system 1100 may encompass software, firmware, and hardware implementations.

The computing system 1100 may be implemented as software programs executable by a computer system. Further, in a non-limiting embodiment of the disclosure, implementations of the computing system 1100 may include distributed processing, component/object distributed processing, and parallel processing. Alternatively, in an embodiment of the disclosure, virtual computer system processing may be constructed to implement various parts of the computing system 1100.

The computing system 1100 is not limited to operation with any particular standards and protocols. In an embodiment of the disclosure, standards for Internet and other packet switched network transmission (e.g., transmission control protocol/internet protocol (TCP/IP), user datagram protocol/internet protocol (UDP/IP), hypertext markup language (HTML), and hypertext transfer protocol (HTTP)) may be used. Such standards are periodically superseded by faster or more efficient equivalents having essentially the same functions. Accordingly, replacement standards and protocols having the same or similar functions as those disclosed are considered equivalents thereof. It may be noted that the methods described in the disclosure may be implemented in a wide variety of electronic devices including, but not limited to, desktop computers, lap top computers, palm top computers, tabs, mobile phones, televisions, and the like. Also, user input may be received by the computing system 1100 using a wide variety of techniques including, but not limited to, using a mouse, a gesture input, a touch input, a stylus input, a joy stick input, a pointer input, and the like.

In an embodiment of the disclosure, the computing system 1100 may be an augmented reality (AR) or virtual reality (VR) device. In this embodiment of the disclosure, the input device 1105 may receive inputs in an AR or VR environment and the output unit or the display 1104 may provide outputs in the AR or VR environment.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method of managing at least one application installed on a computing device, the method comprising:
   identifying the at least one application based on usage data of the computing device that includes a location of the computing device at different times a day;
   fetching archive data and user data corresponding to the at least one application, the archive data including executable data for installing the at least one application and the user data including information for installing the at least one application in a state in which the at least one application was last used on the computing device;
   creating backup data by correlating the archive data with the user data; and
   uninstalling the at least one application.

2. The method of claim 1, wherein the uninstalling of the at least one application comprises uninstalling the at least one application when the creating of the backup data is completed.

3. The method of claim 1,
   wherein the archive data comprises a compressed archive file and the user data comprises a compressed user data file, and
   wherein, upon execution of the archive data, a customized version of the at least one application is installed on the computing device, the customized version being based on the user data.

4. The method of claim 1, wherein the identifying of the at least one application is performed further based on a predetermined factor which includes at least one of:
   an event of a pre-determined time duration,
   an operation profile of the computing device,
   a storage space of the computing device, or
   a time period associated with the at least one application.

5. The method of claim 4, further comprising:
   selecting the at least one application based on at least one of a user selection or the predetermined factor; and
   rendering the at least one application for the user selection through a user interface on the computing device.

6. The method of claim 1, wherein the uninstalling of the at least one application comprises:
   selecting a directory corresponding to the at least one application based on a path of the directory; and
   deleting the directory.

7. The method of the claim 1, further comprising:
   deleting junk data associated with the at least one application and other junk data according to a selection of a user of the computing device; and
   transmitting, to the user, a notification including information about an amount of deleted junk data.

8. The method of claim 1, further comprising:
   installing a customized version of another application based on backup data corresponding to the other application,
   wherein the backup data corresponding to the other application is based on a correlation between archive data and user data corresponding to the other application, and
   wherein the customized version of the other application is based on the user data corresponding to the other application.

9. A computing device, comprising:
   a storage; and
   at least one processor configured to:
      identify at least one application installed in the storage of the computing device based on usage data of the computing device that includes a location of the computing device at different times a day,
      fetch archive data and user data corresponding to the at least one application, the archive data including executable data for installing the at least one application and the user data including information for installing the at least one application in a state in which the at least one application was last used on the computing device,
      create backup data by correlating the archive data with the user data, and
      uninstall the at least one application.

10. The computing device of claim 9, wherein the at least one application is uninstalled after creating the backup data.

11. The computing device of claim 9,
   wherein the archive data comprises a compressed archive file and the user data comprises a compressed user data file, and
   wherein, upon execution of the archive data, the processor is further configured to install a customized version of the at least one application, the customized version being based on the user data.

12. The computing device of claim 9, wherein the identifying of the at least one application is performed further based on a predetermined factor which includes at least one of:
   an event of a pre-determined time duration,
   an operation profile of the computing device,
   a storage space of the storage, or
   a time period associated with the at least one application.

13. The computing device of claim 12, wherein the processor is further configured to select the at least one application based on at least one of a user selection or the predetermined factor.

14. The computing device of claim 13, wherein the processor is further configured to render the at least one application for the user selection through a user interface on the computing device.

15. The computing device of claim 9, wherein the processor is further configured to:
   select a directory corresponding to the at least one application based on a path of the directory, and
   delete the directory.

16. The computing device of claim 9, wherein the processor is further configured to:
   delete junk data associated with the at least one application and other junk data according to a selection of a user of the computing device, and
   transmit, to the user, a notification of information about an amount of deleted junk data on the computing device.

17. The computing device of claim 9, wherein the processor is further configured to:
   analyze the usage data to detect location information of frequently visited places, and identify the at least one application based on the location information.

18. The computing device of claim 9, wherein the processor is further configured to:
analyze the usage data to detect time information indicating a lapse of time after a use of the at least one application, and
identify the at least one application based on the time information.

19. A computing device, comprising:
a memory; and
a processor configured to:
fetch backup data corresponding to at least one application, the backup data being based on a correlation between archive data including executable data for installing the at least one application and user data including information for installing a customized version of the at least one application, the customized version corresponding to a state in which the at least one application was last used on the computing device,
upon fetching the backup data, execute the archive data for installing the customized version of the at least one application, and
identify the at least one application based on usage data of the computing device that includes a location of the computing device at different times a day.

20. The computing device of claim 19, wherein the identifying of the at least one application is performed further based on a predetermined factor which comprises at least one of:
an event of a pre-determined time duration, or
an operation profile of the computing device.

* * * * *